United States Patent [19]

Grant

[11] Patent Number: 5,516,178
[45] Date of Patent: May 14, 1996

[54] TAILGATE CONSTRUCTION

[76] Inventor: Don Grant, 6629 Lyndale, Watauga, Tex. 76148

[21] Appl. No.: 362,205
[22] Filed: Dec. 22, 1994
[51] Int. Cl.⁶ .................................................. B62D 33/03
[52] U.S. Cl. ............................ 296/57.1; 49/371; 52/473; 296/180.5
[58] Field of Search ............................ 296/50, 55, 57.1, 296/180.1, 180.3, 180.5; 49/371, 171; 52/473

[56] References Cited

U.S. PATENT DOCUMENTS

| | | | |
|---|---|---|---|
| 2,646,741 | 7/1953 | Castle | 49/371 |
| 2,759,573 | 8/1956 | Schwab | 49/371 |
| 3,545,131 | 12/1970 | Paytas | 49/171 |
| 4,165,118 | 8/1979 | Jenson | 296/50 |
| 4,200,328 | 4/1980 | Morgan | 296/50 |
| 4,201,411 | 5/1980 | Morgan | 296/50 |
| 4,867,499 | 9/1989 | Stephan et al. | 296/50 |
| 4,902,066 | 2/1990 | Norman | 296/180.1 |
| 4,932,705 | 6/1990 | Miller | 296/50 |
| 5,052,729 | 10/1991 | Huber | 296/57.1 X |

*Primary Examiner*—David M. Mitchell
*Assistant Examiner*—Kia M. Robinson
*Attorney, Agent, or Firm*—Charles D. Gunter, Jr.

[57] ABSTRACT

A low drag tailgate is shown which can be installed within a tailgate opening at the trailing end of the open top cargo compartment of a vehicle. A louver retaining frame is mounted as a portion of the conventional tailgate which has an outer extent mounted generally flush with the exterior sidewall of the tailgate and having an inner extent which provides an opening for the passage of air from the vehicle cargo compartment through the frame. Louvers are pivotally mounted within the louver retaining frame. At least selected ones of the louvers have a counterweight installed thereon which determines the position of the louver as the tailgate is raised and lowered.

6 Claims, 2 Drawing Sheets

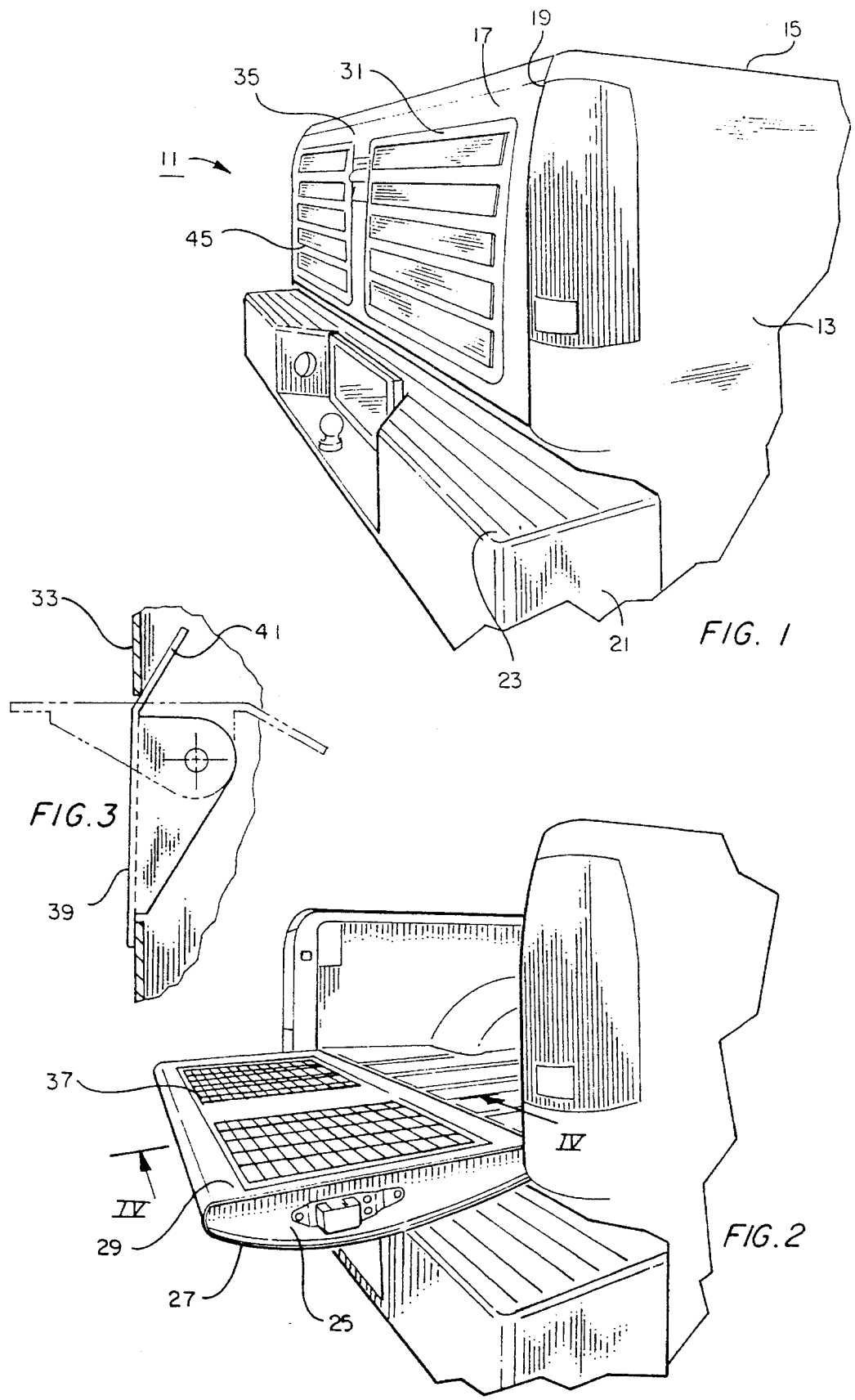

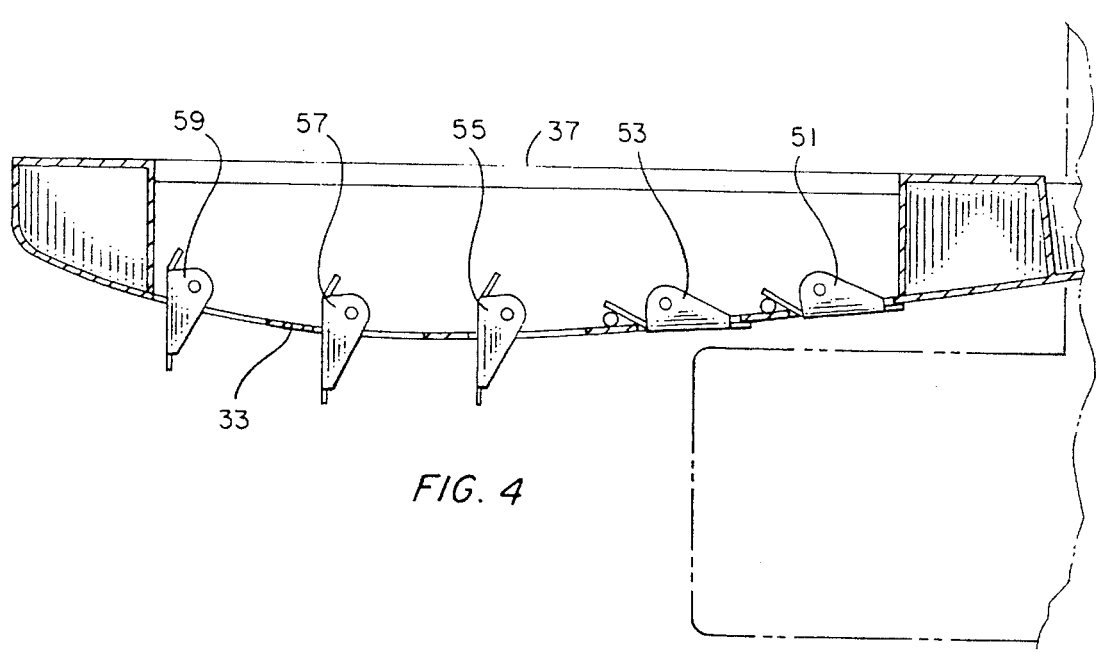
FIG. 4
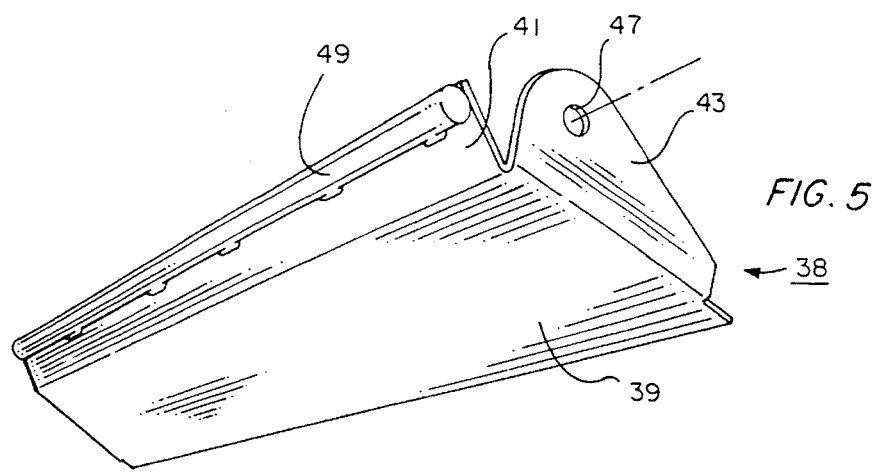
FIG. 5
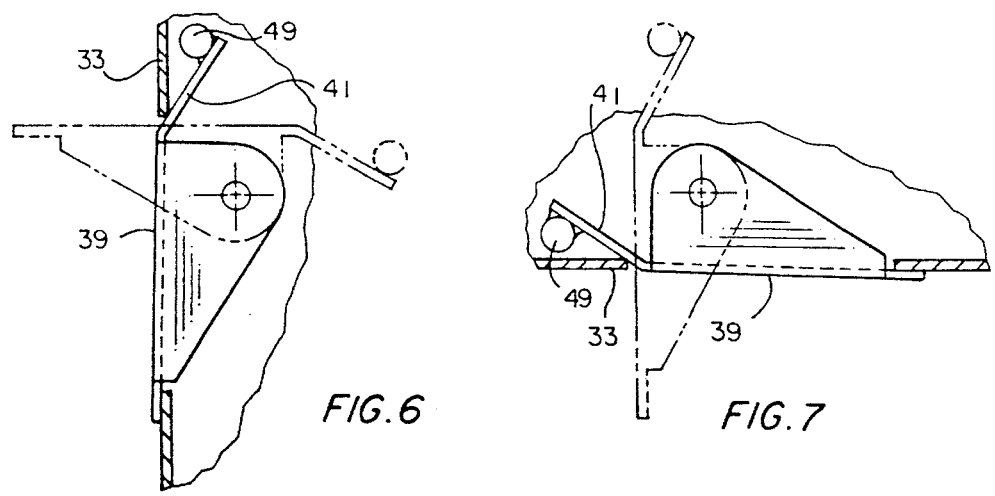
FIG. 6
FIG. 7

TAILGATE CONSTRUCTION

BACKGROUND OF THE INVENTION

1. Field of the Invention

The present invention relates generally to tailgate constructions for pick-up trucks and other vehicles which permit the passage of air therethrough to reduce drag on the vehicle associated with the tailgate construction when the vehicle is in use.

2. Description of the Prior Art

Many types of vehicles have an open top cargo compartment which is closed at the rear end by a tailgate which can be raised and lowered to permit access to the cargo compartment. For example, most pick-up trucks and various trailers typically have such open tops.

It often happens that these type vehicles are driven for long distances with the cargo compartment either empty or very lightly loaded. For example, this is the case where pick-up trucks have as their primary use passenger transportation. The traditional pick-up truck has a rear end of the open top cargo compartment which is closed by a solid tailgate which forms an integral part of the cargo bed structure and thus is typically closed when the vehicle is in operation. When the vehicle is driven with the solid tailgate in the closed position, it causes the tailgate to interrupt or obstruct the flow of air which increases the drag on the vehicle and reduces gas mileage. A significant loss in fuel economy occurs because of the power which is wasted in overcoming this air drag resistance.

Despite the fact that several hinged or louvered tailgate constructions are known in the prior art, certain disadvantages have never been overcome. For example, many of the prior art designs were complicated in nature and utilized a number of mechanical moving parts such as hinges, cranks, and the like. One example is shown in U.S. Pat. No. 4,867,499, issued Sep. 19, 1989, to Stephan et al.

Other of the prior designs were simpler in nature, often consisting of a mere wire grate which served as a replacement for the traditional tailgate. U.S. Pat. No. 4,201,411, issued May 6, 1980, to Morgan, is one variation of this concept. While these designs reduce the effect of air resistance and drag on the vehicle, they are often not esthetically pleasing and require that an entire custom tailgate assembly be provided to replace the stock tailgate.

It is an object of the present invention to provide an improved low drag tailgate which overcomes these and other disadvantages of the prior art.

Another object of the invention is to provide such a low drag tailgate which is simple in design and economical to manufacture.

Another object of the invention is to provide such a low drag tailgate which can be provided as an assembly to be installed within openings provided in a stock vehicle tailgate, allowing the original tailgate to be retained within the end opening of the cargo bed compartment.

Another object of the invention is to provide such a low drag tailgate with a special counterweight mechanism which provides an improved operation of the pivotally mounted louvers of the assembly.

SUMMARY OF THE INVENTION

The low drag tailgate of the invention is located within a tailgate opening at the trailing end of an open top cargo compartment of a vehicle, such as a pick-up truck. The low drag tailgate can include a conventional tailgate including a pair of end plates, an outer sidewall and an inner sidewall. At least one louver retaining frame is mounted as a portion of the conventional tailgate. The louver retaining frame has an outer extent which is mounted generally flush with the outer sidewall of the tailgate and has an inner extent which provides an opening for the passage of air from the vehicle cargo compartment through the frame. A plurality of freely moveable louvers are pivotally mounted within the louver retaining frame, each louver being a horizontally extending slat which is comprised of an outer flap surface, an angularly attached inner lip surface and oppositely arranged ear surfaces. At least selected ones of the louvers have a counterweight installed thereon which determines the position of the louver as the tailgate is raised and lowered.

Typically, a pair of louver retaining frames will be mounted within the conventional tailgate in side-by-side relation, each louver retaining frame having a plurality of counterweighted louvers mounted therein. Preferably, each louver retaining frame includes at least four pivotally mounted louvers which extend generally horizontally with respect to an associated vehicle bumper when the tailgate is in a raised position. At least one of the louvers in each frame which is nearest the vehicle bumper is counterweighted, whereby the counterweighted louver moves to a closed position as the tailgate of the vehicle is lowered. The louver is also free to pivotally move to an open position due to the presence of air current moving through the vehicle cargo compartment when the vehicle is moving. In one embodiment of the invention, the selected louvers are counterweighted by means of a metal rod which is mounted to the angularly attached inner ear surface of the selected louver slat and runs along at least a portion of the length thereof. The louver retaining frames can by either factory installed or supplied as a kit which is installed by a user.

Additional objects, features and advantages will be apparent in the written description which follows.

BRIEF DESCRIPTION OF THE DRAWINGS

FIG. 1 is a perspective view of the low drag tailgate of the invention showing a conventional pick-up truck cargo compartment with portions of the truck body broken away and with the tailgate in the raised position;

FIG. 2 is a view similar to FIG. 1 but showing the low drag tailgate of the invention with the tailgate in the lowered position;

FIG. 3 is a side, partial cross-sectional view of a single pivotally mounted louver showing movement of the louver between open and closed positions within the louver retaining frame;

FIG. 4 is a simplified, schematic view of the operation of the counterweighted louvers of the invention showing the counterweighted louvers in the closed position while the tailgate is lowered;

FIG. 5 is a partial, isolated view of a single louver showing the counterweight thereon;

FIG. 6 is a side, cross-sectional view of a counterweighted louver showing the movement of the louver when the tailgate is in the raised position; and FIG. 7 is a view similar to FIG. 6 but showing the movement of the counterweighted louver when the tailgate is in the lowered position.

DETAILED DESCRIPTION OF THE INVENTION

FIG. 1 shows a low drag tailgate of the invention designated generally as 11. Although not all portions of the cargo compartment are visible, the compartment has sidewalls 13 an open top 15 and a tailgate 17 which is located within a tailgate opening 19 at the trailing end of the open top cargo compartment. The vehicle also includes a bumper 21 having an upper, step surface 23. As shown in FIG. 1, the tailgate 17 is in the raised and locked position. FIG. 2 also shows the tailgate in the lowered, open position.

As best seen in FIG. 2, the tailgate 17 includes a pair of end plates (25 shown in FIG. 2) an outer, arcuate sidewall 27 and an inner, generally planar sidewall 29.

At least one louver retaining frame (31 in FIG. 1) is mounted as a portion of the otherwise conventional tailgate. The frame shown in FIG. 1 is a box-shaped enclosure which can be slid within an appropriate sized opening provided in the tailgate outer and inner sidewalls 27, 29. The louver retaining frame has an outer extent (33 in FIGS. 3 and 4) which is mounted generally flush with the outer sidewall (35 in FIG. 1) of the tailgate. The louver retaining frame also has an inner extent (37 in FIGS. 2 and 4) which, in this case, is covered with a wire mesh. The inner extent or sidewall of the tailgate could also comprise a sheet of metal having apertures located therein or having slats, or the like, to allow for the passage of air from the vehicle cargo compartment through the frame. Unlike certain of the prior art designs, the mesh is not normally visible when the tailgate is in the raised position.

A plurality of freely moveable louvers 38 are pivotally mounted within the louver retaining frame. As shown in FIG. 5, each louver comprises a horizontally extending slat comprised of an outer flap surface 39, an angularly attached inner lip surface 41 and oppositely arranged ear surfaces (43 shown in FIG. 5).

As shown in FIG. 1, there are preferably a pair of louver retaining frames 31, 45 which are mounted within the otherwise conventional tailgate in side-by-side relation. Preferably, each louver retaining frame 31, 45 includes at least four pivotally mounted louvers which extend generally horizontally with respect to the associated vehicle bumper 21 when the tailgate is in the raised position. At least one of the louvers in each frame which is nearest the vehicle bumper is counterweighted, whereby the counterweighted louver moves to a closed position (FIG. 7) as the vehicle tailgate is lowered. The louver is also free to move to an open position (FIG. 6) due to the presence of air current moving through the vehicle cargo compartment when the vehicle is moving.

As shown in FIG. 5, the opposing ears 43 have openings 47 which serve as pivot points for mounting the louver within the respective frame, as on a pivot pin (not shown). The angularly attached inner lip surface 41 is counterweighted by means of a metal rod 49 which is mounted, as by welding, to the angularly attached inner lip surface of the selected louver slat and runs along at least a portion of the length thereof. Preferably, the rod is of metal, such as iron or steel and runs for substantially the entire length of the lip surface 41.

Although the invention has been described in terms of the modification of a conventional tailgate, it will be understood that the tailgate assembly could be installed at the factory or that an entire custom tailgate could be sold and installed within the trailing end of the cargo compartment of the vehicle.

FIG. 4 is a simplified, schematic view showing a typical frame arrangement in which the bottom two louvers 51, 53 are counterweighted, while the upper louvers 55, 57, 59 are not counterweighted. Note that in FIG. 4, with the tailgate in the lowered position, the counterweighted louvers close, thereby not interfering with the vehicle bumper. FIGS. 6 and 7 show the relative positions of the counterweighted louvers when the tailgate is in the raised position (FIG. 6) and in the lowered position (FIG. 7) in solid lines and with the vehicle at rest. When the tailgate is raised, the louvers will normally appear in the closed position shown in FIG. 1. However, air pressure within the cargo compartment while the vehicle is moving is sufficient to open not only the uncounterweighted louvers (shown in phantom lines in FIG. 3), but the counterweighted louvers as well shown in phantom lines in FIG. 6.

An invention has been provided with several advantages. The tailgate construction of the invention reduces air drag within the cargo compartment, thereby providing for more economical operation of the vehicle. The tailgate construction is simple in design and economical to manufacture and presents a pleasing esthetic appearance when the tailgate is in the raised position. The tailgate can be provided as a kit for installation within a conventional vehicle tailgate or an entire tailgate can be custom fabricated and sold as a unit. The unique counterweight aspect of the louvers and louver retaining frame provide a simple mechanism which allows the louvers to open as the vehicle is operated but automatically closes the louvers in the proximity of the bumper, to prevent damage to the louvers as the tailgate is lowered. The counterweight provides a simple and economical mechanism for operation of the tailgate assembly which does not require cranks, levers, gears and other complicated mechanisms found in the prior art.

While the invention has been shown in only one of its forms, it is not thus limited but is susceptible to various changes and modifications without departing from the spirit thereof.

What is claimed is:

1. A low drag tailgate located within a tailgate opening at a trailing end of an open top cargo compartment of a vehicle, the low drag tailgate comprising:

a conventional tailgate including a pair of end plates, an outer sidewall, and an inner sidewall;

at least one louver retaining frame mounted as a portion of the conventional tailgate, the louver retaining frame having an outer extent mounted generally flush with the outer sidewall of the tailgate and having an inner extent which provides an opening for the passage of air from the vehicle cargo compartment through the frame;

a plurality of freely moveable louvers pivotally mounted within the louver retaining frame, each louver being a horizontally extending slat comprised of an outer flap surface, an angularly attached inner lip surface and oppositely arranged ear surfaces;

wherein at least selected ones of the louvers have a counterweight installed thereon which determines the position of the louver as the tailgate is raised and lowered; and wherein each louver retaining frame includes at least four pivotally mounted louvers which extend generally horizontally with respect to an associated vehicle bumper when the tailgate is in a raised position, and wherein at least one of the louvers in each frame which is nearest the vehicle bumper has counter weighted means which move the at least one of the louvers to a closed position as the vehicle tailgate is lowered, the louver being free to move to an open position due to the presence of air current moving through the vehicle cargo compartment when the vehicle is moving.

2. The tailgate of claim 1, wherein a pair of louver retaining frames are mounted within the conventional tailgate in side by side relation, each louver retaining frame having a plurality of counter weighted louvers mounted therein.

3. The tailgate of claim 1, wherein the selected louvers are counter weighted by means of a metal rod which is mounted to the angularly attached inner lip surface of the selected louver slat and runs along the length thereof.

4. A tailgate assembly for mounting within a tailgate located within a tailgate opening at a trailing end of an open top cargo compartment of a vehicle where the tailgate has a pair of end plates, an outer sidewall, and an inner sidewall, the tailgate assembly comprising:

a louver retaining frame mountable as a portion of a conventional tailgate, the louver retaining frame having an outer extent adapted to be mounted generally flush with the outer sidewall of the tailgate and having an inner extent which provides an opening for the passage of air from the vehicle cargo compartment through the frame;

a plurality of freely moveable louvers pivotally mounted within the louver retaining frame, each louver being a horizontally extending slat comprised of an outer flap surface, an angularly attached inner lip surface and oppositely arranged ear surfaces;

wherein at least selected ones of the louvers have a counterweight installed thereon which determines the position of the louver as the tailgate is raised and lowered; and wherein each louver retaining frame includes at least four pivotally mounted louvers which extend generally horizontally with respect to an associated vehicle bumper when the tailgate is in a raised position, and wherein at least one of the louvers in each frame which is nearest the vehicle bumper has counter weighted means which move the at least one of the louvers to a closed position as the vehicle tailgate is lowered, the louver being free to move to an open position due to the presence of air current moving through the vehicle cargo compartment when the vehicle is moving.

5. The tailgate of claim 4, wherein the selected louvers are counter weighted by means of a metal rod which is mounted to the angularly attached inner lip surface of the selected louver slat and runs along the length thereof.

6. A method of allowing for the free flow of air through the cargo compartment of a vehicle having a tailgate located within a tailgate opening at a trailing end of an open top cargo compartment where the tailgate has a pair of end plates, an outer sidewall, and an inner sidewall, the method comprising the steps of:

mounting at least one louver retaining frame within the tailgate, the louver retaining frame having an outer extent which is mounted generally flush with the outer sidewall of the tailgate and having an inner extent which provides an opening for the passage of air from the vehicle cargo compartment through the frame;

mounting a plurality of freely moveable louvers pivotally within the louver retaining frame, each louver being a horizontally extending slat comprised of an outer flap surface, an angularly attached inner lip surface and oppositely arranged ear surfaces;

providing at least selected ones of the louvers with a counterweight installed thereon which determines the position of the louver as the tailgate is raised and lowered; and wherein each louver retaining frame includes at least four pivotally mounted louvers which extend generally horizontally with respect to an associated vehicle bumper when the tailgate is in a raised position, and wherein at least one of the louvers in each frame which is nearest the vehicle bumper has counter weighted means which move the at least one of the louvers to a closed position as the vehicle tailgate is lowered, the louver being free to move to an open position due to the presence of air current moving through the vehicle cargo compartment when the vehicle is moving.

\* \* \* \* \*